United States Patent
Ghaffari et al.

(10) Patent No.: US 11,414,057 B2
(45) Date of Patent: Aug. 16, 2022

(54) RETRACTABLE PEDAL ASSEMBLY FOR A VEHICLE

(71) Applicant: GM Global Technology Operations LLC, Detroit, MI (US)

(72) Inventors: Ali Ghaffari, Rochester, MI (US); Steven J. Weber, Mount Clemens, MI (US); Tomasz R. Warzecha, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 16/373,789

(22) Filed: Apr. 3, 2019

(65) Prior Publication Data
US 2020/0317167 A1 Oct. 8, 2020

(51) Int. Cl.
*B60T 7/06* (2006.01)
*F16H 19/00* (2006.01)
*G05D 1/00* (2006.01)

(52) U.S. Cl.
CPC .............. *B60T 7/06* (2013.01); *F16H 19/001* (2013.01); *G05D 1/0061* (2013.01)

(58) Field of Classification Search
CPC ........................................................ B60T 7/06
See application file for complete search history.

(56) References Cited

U.S. PATENT DOCUMENTS

| 6,736,233 | B2 * | 5/2004 | Beishline | H02K 11/38 74/513 |
| 6,782,776 | B2 * | 8/2004 | Oberheide | B60T 7/06 74/512 |
| 8,701,522 | B2 * | 4/2014 | Kim | F02D 11/02 74/514 |
| 10,001,186 | B2 * | 6/2018 | Kasper | F16D 65/22 |
| 10,166,954 | B2 * | 1/2019 | Houtman | B60T 7/042 |
| 10,525,951 | B2 * | 1/2020 | Hansmann | B60T 11/18 |
| 10,988,097 | B2 * | 4/2021 | Ghaffari | B60R 21/09 |
| 11,098,097 | B2 * | 8/2021 | Stout | A61P 29/00 |
| 11,099,596 | B2 * | 8/2021 | Kihara | G05G 1/60 |
| 11,148,646 | B2 * | 10/2021 | Ghaffari | G05D 1/0061 |
| 2007/0068321 | A1 * | 3/2007 | Song | G05G 1/405 74/512 |
| 2018/0093648 | A1 * | 4/2018 | Pennala | B60T 7/042 |
| 2020/0001838 | A1 * | 1/2020 | Hurd | B60T 7/12 |

(Continued)

Primary Examiner — Michael A Berns
(74) Attorney, Agent, or Firm — Quinn IP Law (57) ABSTRACT

An automotive vehicle includes a body having a passenger compartment and a pedal assembly disposed within the passenger compartment. The pedal assembly includes a brake pedal emulator housing and at least one pedal coupled to the brake pedal emulator housing. The at least one pedal is actuatable by an occupant. The vehicle includes a first gearing element operably coupled to the pedal and a second gearing element operably coupled with the first gearing element. The vehicle further includes an actuator operably coupled to the second gearing element. The actuator is configured to disengage from the second gearing element and apply a motive force to the second gearing element. The vehicle further includes at least one controller in communication with the actuator. The controller is configured to control the actuator to move the pedal to the first position and control the actuator to move the pedal to the second position.

18 Claims, 5 Drawing Sheets

(56) References Cited

U.S. PATENT DOCUMENTS

| | | | | |
|---|---|---|---|---|
| 2020/0272193 A1* | 8/2020 | Battlogg | ............... | F16F 9/535 |
| 2020/0317166 A1* | 10/2020 | Ghaffari | ............... | B60K 26/02 |
| 2020/0317167 A1* | 10/2020 | Ghaffari | ................ | B60T 7/06 |
| 2021/0109560 A1* | 4/2021 | Ford | ................ | B60K 26/02 |

* cited by examiner

RETRACTABLE PEDAL ASSEMBLY FOR A VEHICLE

INTRODUCTION

The present disclosure relates generally to retractable and stowable pedal assemblies.

The operation of modern vehicles is becoming more automated, i.e. vehicles are able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

Embodiments according to the present disclosure provide a number of advantages. For example, the present disclosure provides a system and method for providing control interfaces to a vehicle operator when useful and moving such control interfaces out of the operator's way when unnecessary, thereby avoiding unintentional control inputs and increasing occupant comfort.

An automotive vehicle according to the present disclosure includes a body having a passenger compartment and a pedal assembly disposed within the passenger compartment. The pedal assembly includes a brake pedal emulator housing and at least one pedal coupled to the brake pedal emulator housing and the at least one pedal is actuatable by an occupant. The vehicle additionally includes a first gearing element operably coupled to the pedal and a second gearing element operably coupled to the brake pedal emulator housing and operably coupled with the first gearing element. The vehicle further includes an actuator operably coupled to the second gearing element. The actuator is configured to disengage from the second gearing element and apply a motive force to the second gearing element. The actuator is configured to selectively move the pedal between a first position with respect to the passenger compartment and a second position with respect to the passenger compartment. The vehicle further includes at least one controller in communication with the actuator. The controller is configured to, in response to satisfaction of a first operating condition, control the actuator to move the pedal to the first position, and, in response to satisfaction of a second operating condition, control the actuator to move the pedal to the second position.

In an exemplary embodiment, the pedal includes a pedal arm having a first end and a second end and a pedal interface. The first gearing element is operably coupled to the pedal arm at the first end and in meshing engagement with the second gearing element and the pedal interface is coupled to the pedal arm at the second end.

In an exemplary embodiment, the vehicle further includes a push rod coupled to the pedal and operatively coupled to the actuator. The actuator includes a rotatable threaded member configured to engage with the second gearing element such that rotation of the threaded member drives the second gearing element in rotation.

In an exemplary embodiment, the actuator is linearly oriented with the push rod and the second gearing element.

In an exemplary embodiment, the first gearing element is a spur gear and the second gearing element is a worm gear.

In an exemplary embodiment, the vehicle further includes a third gearing element. The third gearing element is operably coupled to the first gearing element and the second gearing element.

In an exemplary embodiment, the first and third gearing elements are a set of beveled gears and the second gearing element is a worm gear.

In an exemplary embodiment, the first operating condition is an automated driving system not controlling vehicle driving behavior and the second operating condition is the automated driving system controlling vehicle driving behavior.

In an exemplary embodiment, the actuator is disengaged from the second gearing element when the first operating condition is satisfied and drives rotation of the second gearing element when the second operating condition is satisfied.

In an exemplary embodiment, the second gearing element axially translates relative to the brake pedal emulator housing when the first operating condition is satisfied.

In an exemplary embodiment, the first position of the pedal is a deployed position and the second position of the pedal is a stowed position.

A pedal assembly for a vehicle according to the present disclosure includes a brake pedal emulator housing and at least one pedal operably coupled to the brake pedal emulator housing and actuatable by an occupant. The pedal assembly additionally includes a gearing assembly operably coupled to the brake pedal emulator housing and the pedal. The pedal assembly further includes an actuator operably coupled to the brake pedal emulator housing and the gearing assembly. The gearing assembly is configured to selectively move the pedal between a deployed position with respect to the brake pedal emulator housing and a stowed position with respect to the brake pedal emulator housing. The actuator is configured to actuate the pedal to the deployed position in response to a deploy command from a controller and to actuate the pedal to the stowed position in response to a stow command from the controller.

In an exemplary embodiment, the actuator includes a rotatable threaded member configured to engage with the gearing assembly such that rotation of the threaded member drives the gearing assembly in rotation.

In an exemplary embodiment, the gearing assembly includes a first gearing element operably coupled to the pedal and a second gearing element operably coupled to the actuator and in meshing engagement with the first gearing element. The actuator selectively drives the second gearing element such that rotation of the second gearing element drives the first gearing element in rotation.

In an exemplary embodiment, the actuator is configured to disengage from the second gearing element and allow translation of the second gearing element relative to the brake pedal emulator housing.

In an exemplary embodiment, the pedal assembly further includes a push rod coupled to the pedal and operatively coupled to the actuator.

In an exemplary embodiment, the actuator is linearly oriented with the push rod.

In an exemplary embodiment, the controller is configured to generate the deploy command in response to satisfaction of a first operating condition and to generate the stow command in response to satisfaction of a second operating condition.

In an exemplary embodiment, the first operating condition is an automated driving system not controlling vehicle driving behavior and the second operating condition is the automated driving system controlling vehicle driving behavior.

A method of controlling an automotive vehicle according to the present disclosure includes providing a vehicle with a first actuator configured to control vehicle acceleration or braking, a controller configured to selectively control the first actuator in an autonomous mode according to an automated driving system, a pedal assembly having a brake pedal emulator housing, at least one pedal operably coupled to the brake pedal emulator housing and actuatable by an occupant, a gearing assembly operably coupled to the brake pedal emulator housing and the pedal, and a second actuator operably coupled to the brake pedal emulator housing and the gearing assembly. The method additionally includes, in response to the controller controlling the first actuator in the autonomous mode, automatically controlling the second actuator, via the controller, to actuate the gearing assembly to move the pedal to a stowed position. The method further includes, in response to the controller not controlling the first actuator in the autonomous mode, automatically controlling the second actuator, via the controller, to actuate the gearing assembly to move the pedal to a deployed position.

The above and other advantages and features of the present disclosure will be apparent from the following detailed description of the preferred embodiments when taken in connection with the accompanying drawings.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
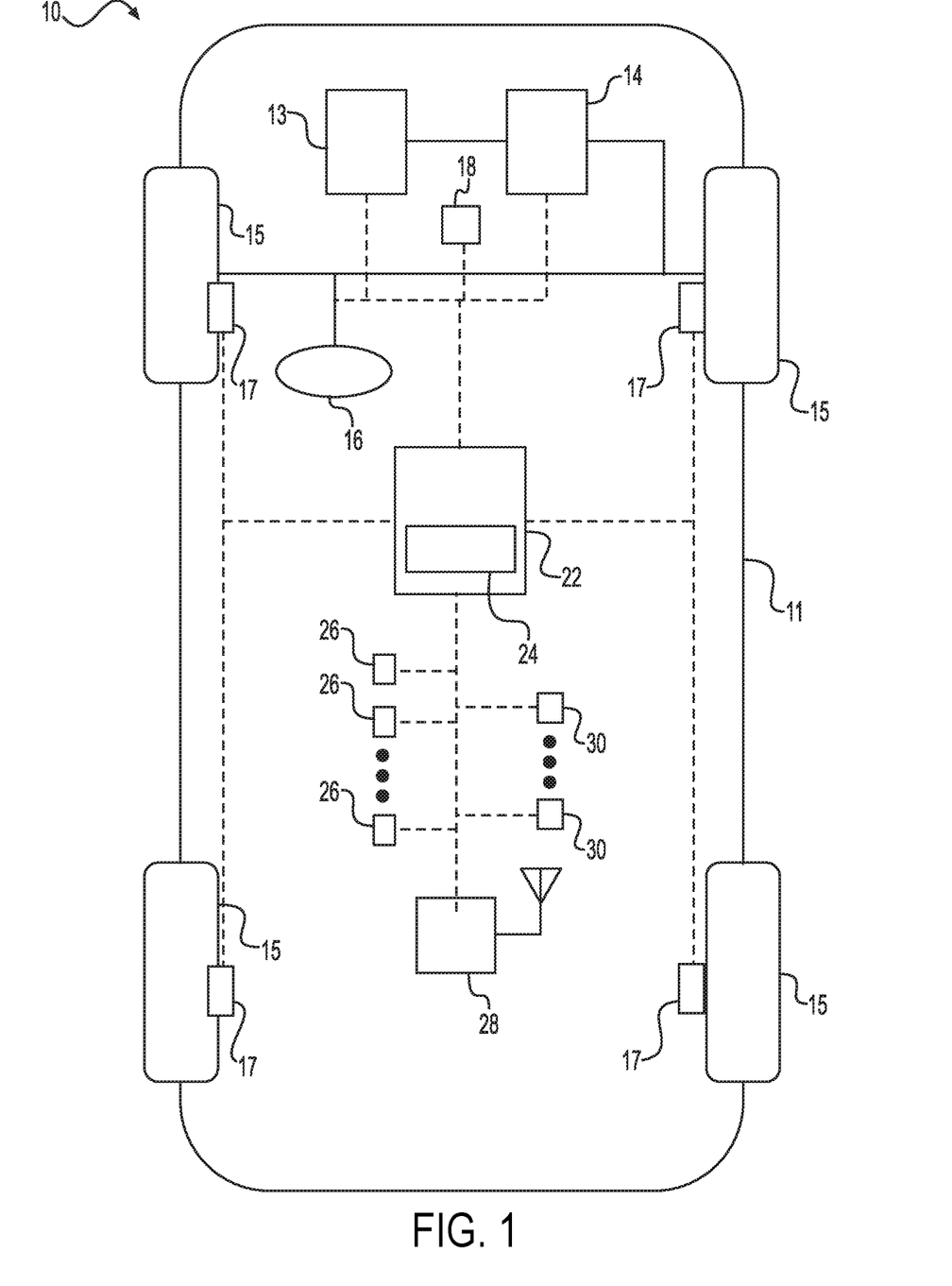
FIG. 1 is a schematic diagram of a vehicle according to an embodiment of the present disclosure.

FIG. 1 schematically illustrates an automotive vehicle 10 according to the present disclosure. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used. The vehicle 10 includes a propulsion system 13, which may in various embodiments include an internal combustion engine, an electric machine such as a traction motor, and/or a fuel cell propulsion system.

The vehicle 10 generally includes a body 11 and wheels 15. The body 11 encloses the other components of the vehicle 10 and also defines a passenger compartment. The wheels 15 are each rotationally coupled to the body 11 near a respective corner of the body 11.

The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission.

The vehicle 10 additionally includes a steering system 16. While depicted as including a steering wheel for illustrative purposes, in some embodiments contemplated within the scope of the present disclosure, the steering system 16 may not include a steering wheel.

The vehicle 10 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems. In various embodiments, the braking system includes a primary brake actuator and a secondary brake actuator configured to create torque at each wheel brake 17 by various methods including, for example and without limitation, electromechanical hydraulic pressure, electromechanical clamping force and/or other braking methods. In some embodiments, the primary and secondary brake actuators are in electronic communication with a brake control module. In some embodiments, each of the primary and secondary brake actuators are in communication with a single brake control module. In other embodiments, the primary and secondary brake actuators are each in electronic communication with a brake control module. In some embodiments, the brake control module includes an electronic brake controller.

The vehicle 12 additionally includes at least one pedal assembly 18. In an exemplary embodiment, the at least one pedal assembly 18 includes a first pedal, which may be referred to as an accelerator pedal, for controlling the propulsion system 13 and a second pedal, which may be referred to as a brake pedal, for controlling the wheel brakes 17.

In various embodiments, the vehicle 10 also includes a navigation system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, wheel brakes 17 via the brake control module, and pedal assembly 18 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 via one or more brake control modules to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

In the illustrated embodiment, the vehicle 10 is a so-called dual mode vehicle, capable of being operated by a human driver or by the ADS 24. When the vehicle 10 is under the control of a human driver, control interfaces such as a steering wheel and the at least one pedal assembly 18 should be accessible by the human driver. However, when the vehicle 10 is under the control of the ADS 24, human operation of such control interfaces may be unnecessary, undesirable, or both.

In the embodiments of the pedal assembly discussed herein, an active mechanical brake pedal emulator (BPE) arm linkage enables the pedal to move between a deployed position and a stowed position. Embodiments of the present disclosure transfer force from the pedal to the BPE using a gear tooth and worm wheel arrangement to allow for greater packaging flexibility of the pedal assembly in the vehicle.

Figure 2:
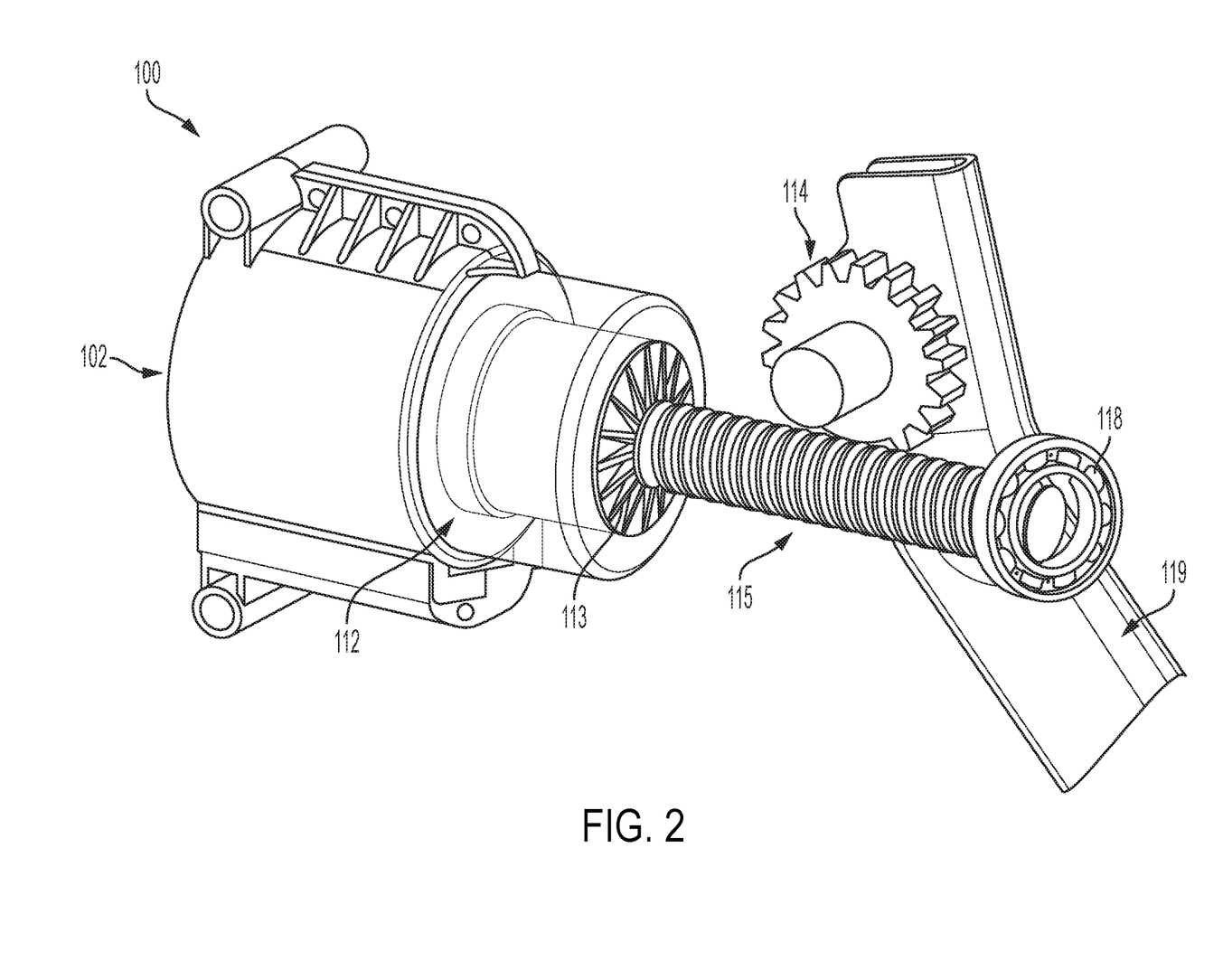
FIG. 2 is a schematic view of a pedal assembly, according to a first embodiment of the present disclosure.
Figure 3A:
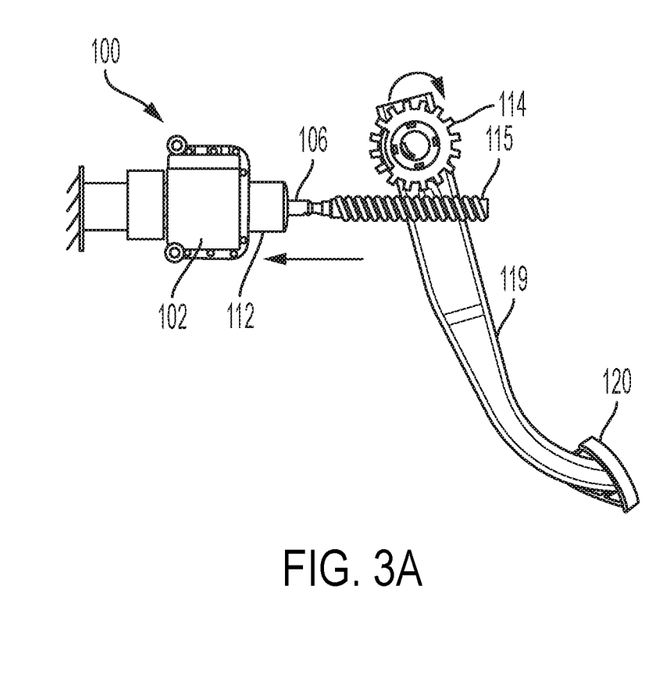
FIGS. 3A and 3B are schematic views of a pedal assembly, according to an embodiment.
Figure 3B:
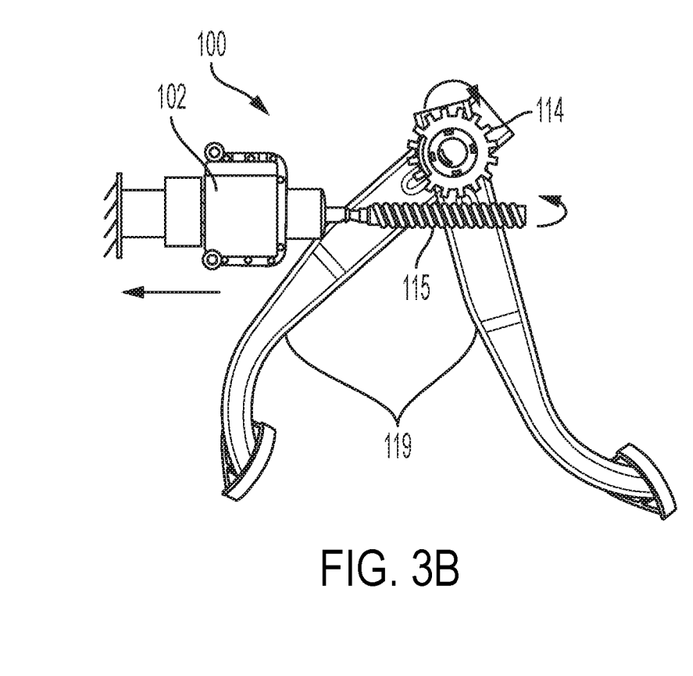

Referring now to FIGS. 2, 3A, and 3B, a pedal assembly 100 according to an embodiment of the present disclosure is illustrated. In various embodiments, the pedal assembly 100 includes a brake pedal emulator (BPE) housing 102 enclosing a BPE, a push rod 106 operably coupled to the BPE, an actuator 112 operably coupled to the BPE, a first gearing element 114, a second gearing element 115, a support member 118, and a pedal having a pedal arm 119 operably coupled to the push rod 106. A pedal interface 120 is coupled to the pedal arm 119. The push rod 106 is configured to translate relative to the BPE housing 102 when the pedal interface 120 is depressed by an operator.

The pedal assembly 100 includes at least one actuator 112. In various embodiments, the actuator 112 may be physically secured to an exterior or interior portion of the BPE housing 102. In an exemplary embodiment, the actuator 112 includes a rotatable threaded drive member 113. Selective engagement of the actuator 112 permits translation of force to the BPE resulting in a braking instruction that is conveyed to the vehicle brake system during a first or manual driving mode. Selective engagement of the actuator 112 also allows rotation of the pedal arm 119 relative to the BPE housing 102 between a deployed position and a stowed position during a second or autonomous driving mode. In some embodiments, as shown in FIG. 2, the actuator 112 is axially oriented with the second gearing element 115. The second gearing element 115 may translate due to force applied by the first gearing element during the manual driving mode and act as a push rod to convey a braking instruction to the BPE. In some embodiments, as shown in FIG. 3, the actuator 112 is axially oriented with the push rod 106 and the push rod 106 conveys the braking instruction to the BPE during the manual driving mode.

The actuator 112 is in communication with or under the control of the controller 22. The actuator 112 may comprise an electric motor, an accumulator, other suitable actuator type, or any combination thereof. The actuator 112 is selectively operable according to at least a first mode and a second mode based on commands from the controller 22.

The pedal arm 119 has a first end and a second end opposite the first end. The first gearing element 114, e.g. a spur gear, is operably coupled to the pedal arm 119 at the first end. The pedal interface 120 is operably coupled to the pedal arm 119 at the second end. In the embodiment shown in FIGS. 3A and B, the first gearing element 114 is in meshing engagement with the second gearing element 115, e.g. a worm gear, which is coupled to the push rod 106 such that the push rod 106 and the second gear 115 share a common longitudinal axis. The actuator 112 may be coupled to the second gearing element 115 such that the actuator 112 drives rotation of the second gearing element 115 to move the pedal arm 119 between a first position and a second position. The first position of the pedal may be referred to as a deployed position and the second position may be referred to as a stowed position. The actuator 112 is also configured to disengage from the second gearing element 115 to allow axially translation of the second gearing element 115 when the pedal arm 119 is depressed or released by an operator. While the embodiment shown in FIG. 2 illustrates a spur gear and a worm gear, it is understood that other gearing combinations may be used, such as a rack and pinion system, etc., for example and without limitation.

As shown in FIG. 3A, in a first mode, which may be referred to as a manual driving mode, the actuator 112 is disengaged from the second gearing element 115. Disengagement of the actuator 112 from the second gearing element 115 may be a result of the actuator operating in a standby or unpowered mode. When disengaged or unpowered, the actuator 112 does not rotate the second gearing element 115. The disengagement of the actuator 112 from the second gearing element 115 allows the second gearing element 115 to move axially relative to the BPE housing 102 in response to force applied by the first gearing element 114. In the first mode, depression of the pedal via the pedal interface 120 results in rotation of the first gearing element 114. Engagement of the teeth of the first gearing element 114 with the teeth of the second gearing element 115 axially translates the second gearing element 115. The axial translation of the second gearing element 115 transmits the force applied by the operator on the pedal interface 120 to the BPE which, along with the controller 22, determines the desired braking command and transmits a brake command signal to the vehicle braking system.

With continued reference to FIGS. 2, 3A, and 3B, in the second mode, which may be referred to as a stowage mode, the actuator 112, via the rotatable drive member 113, provides a motive force to move the pedal arm 119 between a plurality of positions. The actuator 112, via the rotatable drive member 113, controls the second gearing element 115 to rotate in a first direction to drive rotation of the first gearing element 114 in a first direction to move the pedal arm 119 from the deployed position to the stowed position, as shown in FIG. 3B. Likewise, the actuator 112, via the rotatable drive member 113, controls the second gearing element 115 to rotate in a second direction to drive rotation of the first gearing element 114 in a second direction to move the pedal arm 119 from the stowed position to the deployed position.

In some embodiments, the actuator 112 controls translation of the BPE housing 102 relative to the interior of the passenger compartment. In various embodiments, both translation of the BPE housing 102 and rotation of the pedal from the deployed position to the stowed position occur when the vehicle is operating in an autonomous or semi-autonomous mode. In some embodiments, the translation of the BPE housing 102 and rotation of the pedal arm occur simultaneously but in other embodiments these movements may occur sequentially in any order.

With continued reference to FIG. 2, in some embodiments the support member 118 is coupled to an end of the second gearing element 115 to prevent bending of the second gearing element 115. The support member 118 may be coupled to an interior structure of the passenger compartment to provide support for the second gearing element 115. In some embodiments, the support member 118 is a bearing that supports and allows rotation of the second gearing element 115.

Figure 4:
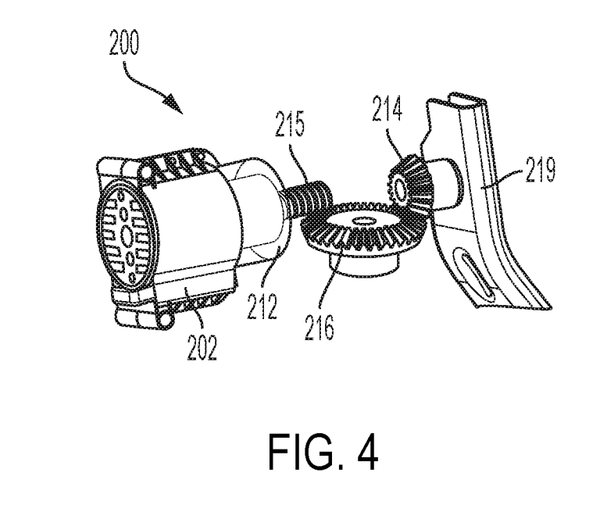
FIG. 4 is a schematic view of a pedal assembly, according to a second embodiment of the present disclosure.

Referring now to FIG. 4, a pedal assembly 200 according to a second embodiment of the present disclosure is illustrated. The pedal assembly 200 includes a BPE housing 202 operably coupled with a pedal arm 219. The pedal arm 219 is coupled with a first gearing element 214. The pedal assembly 200 is provided with an actuator 212 configured to control rotation of a second gearing element 215. The actuator 212 is selectively operable according to a first mode and a second mode, generally similarly as discussed above with respect to the actuator 112 of FIG. 2.

As shown in FIG. 4, in some embodiments, a third gearing element 216 provides an interface between the first and second gearing elements 214, 215. In some embodiments, the first and third gearing elements 214, 216 are a set of beveled gears and the second gearing element 215 is a worm gear. However, it is understood that other gearing arrangements and gear features including gear size, number of teeth, and number of gears, for example and without limitation, may be varied to accommodate different vehicle architectures.

Figure 5:
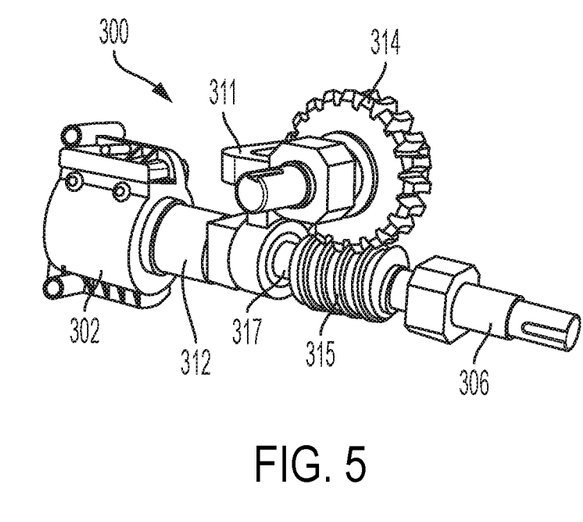
FIG. 5 is a schematic view of a pedal assembly, according to a third embodiment of the present disclosure.

FIG. 5 illustrates a pedal assembly 300 according to a third embodiment of the present disclosure. The pedal assembly 300 includes a BPE housing 302 operably coupled with a pedal arm (not shown) via a first gearing element 314. The first gearing element 314 may rotate on a shaft supported by a support structure 311. The support structure 311 may be coupled to a shaft 317. The pedal assembly 300 is provided with an actuator 312 configured to control rotation of a second gearing element 315 coupled to the shaft 317. The pedal assembly 300 further includes a push rod 306. In the embodiment shown in FIG. 5, the second gearing element 315 is positioned between the actuator 312 and the push rod 306. The actuator 312 is selectively operable according to a first mode and a second mode, generally similarly as discussed above with respect to the actuator 112 of FIG. 2.

Figure 6:
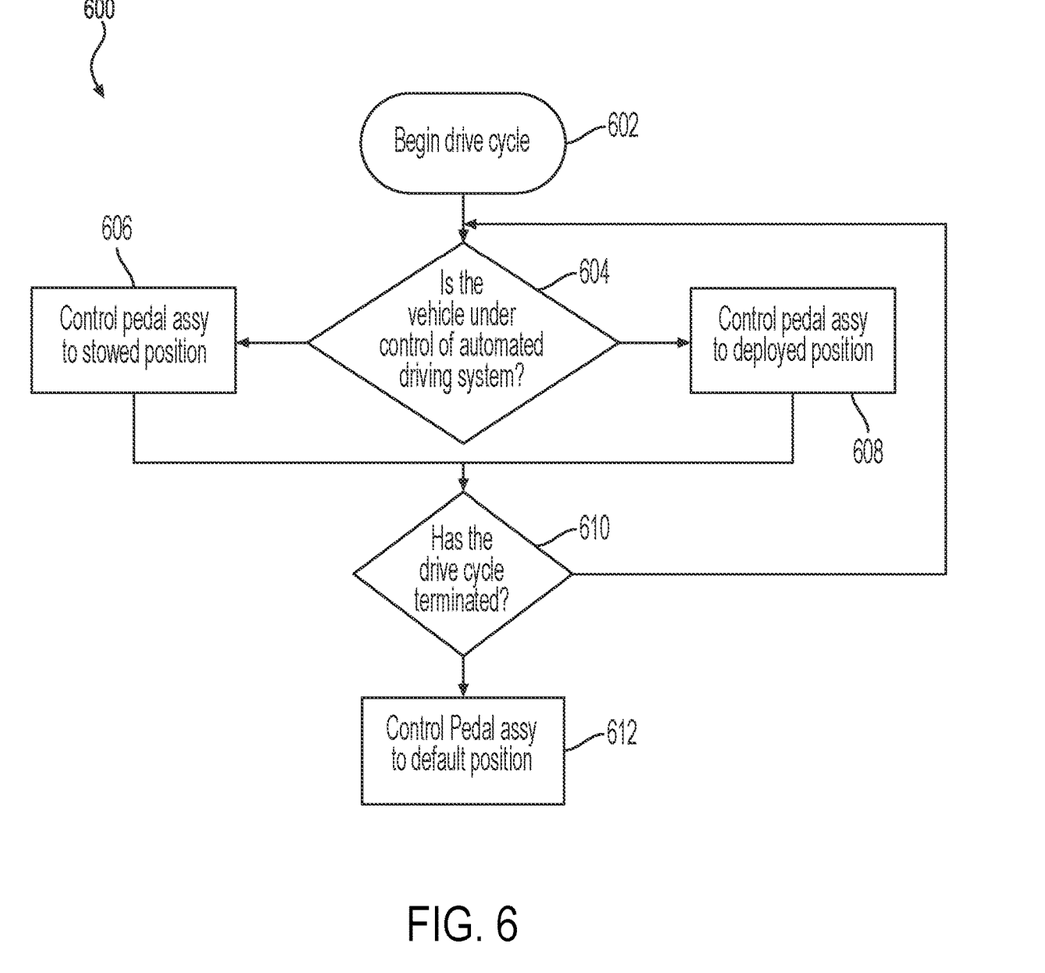
FIG. 6 is a flowchart representation of a method of controlling a vehicle, according to an embodiment.

Referring now to FIG. 6, a method 600 of controlling an automotive vehicle is illustrated in flowchart form. The method 600 can be utilized in connection with the controller 22 or by one or more of the brake control modules as discussed herein, or by other systems associated with or separate from the vehicle, in accordance with exemplary embodiments. The order of operation of the method 600 is not limited to the sequential execution as illustrated in FIG. 10, but may be performed in one or more varying orders, or steps may be performed simultaneously, as applicable in accordance with the present disclosure.

A vehicle drive cycle begins, as illustrated at block 602.

A determination is made of whether the vehicle is under the control of the ADS 24, as illustrated at operation 604. In an exemplary embodiment, this determination is made by the controller 22.

If the determination of operation 604 is positive, that is, the vehicle is under the control of the ADS 24, then the pedal assembly is controlled to a stowed position by the one or more actuators, as illustrated at block 606. This may be performed, for example, by the mechanisms and methods discussed above with respect to FIGS. 2-5.

If the determination of operation 604 is negative, that is, the vehicle is not under the control of the ADS 24, then the pedal assembly is controlled to or maintained at a deployed position, as illustrated at block 608.

Subsequent to either block 606 or block 608, a determination is made of whether the drive cycle has terminated, as illustrated at operation 610. In an exemplary embodiment, this determination is made by the controller 22.

If the determination of operation 610 is negative, i.e. the drive cycle has not ended, then control returns to operation 604. The algorithm thus monitors ADS control of the vehicle and controls the pedal assembly accordingly unless and until the current drive cycle terminates.

If the determination of operation 610 is positive, i.e. the drive cycle has ended, then the pedal assembly is controlled to a default position, as illustrated at block 612. In an exemplary embodiment, the default position corresponds to the deployed position. However, in other embodiments the default position may correspond to the stowed position. The algorithm then terminates.

As may be seen the present disclosure provides a system and method for providing control interfaces to a vehicle operator when useful and moving such control interfaces out of the operator's way when unnecessary, thereby avoiding unintentional control inputs and increasing occupant comfort. Moreover, systems and methods according to the present disclosure may provide these benefits in a relatively compact package. In some embodiments, the pedal arm of the pedal assembly may be retracted to a stowed position with visual and/or other indicators provided to clearly communicate to the operator that the operator is no longer in control of the vehicle and cannot take over control via depression of the pedal arm. In some embodiments, operation of the vehicle in a manual driving mode, that is, the vehicle is not in an autonomous mode of operation and control of the vehicle is not provided by the controller, the pedal arm automatically transitions to the deployed position and a brake pedal emulator may be engaged to the pedal arm to allow pedal application by the operator.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
a body having a passenger compartment;
a pedal assembly disposed within the passenger compartment, the pedal assembly comprising a brake pedal emulator housing and at least one pedal coupled to the brake pedal emulator housing, the at least one pedal actuatable by an occupant;
a first gearing element operably coupled to the at least one pedal;
a second gearing element operably coupled to the brake pedal emulator housing and operably coupled with the first gearing element;
an actuator operably coupled to the second gearing element, the actuator being configured to disengage from the second gearing element and apply a motive force to the second gearing element, the actuator being configured to selectively move the at least one pedal between a first position with respect to the passenger compartment and a second position with respect to the passenger compartment; and
at least one controller in communication with the actuator, the at least one controller being configured to, in response to satisfaction of a first operating condition, control the actuator to move the at least one pedal to the first position, and, in response to satisfaction of a second operating condition, control the actuator to move the at least one pedal to the second position.

2. The automotive vehicle of claim 1, wherein the at least one pedal comprises a pedal arm having a first end and a second end and a pedal interface, the first gearing element operably coupled to the pedal arm at the first end and in meshing engagement with the second gearing element and the pedal interface coupled to the pedal arm at the second end.

3. The automotive vehicle of claim 1 further comprising a push rod coupled to the at least one pedal and operatively coupled to the actuator, wherein the actuator comprises a rotatable threaded member configured to engage with the second gearing element such that rotation of the threaded member drives the second gearing element in rotation.

4. The automotive vehicle of claim 3, wherein the actuator is linearly oriented with the push rod and the second gearing element.

5. The automotive vehicle of claim 1, wherein the first gearing element is a spur gear and the second gearing element is a worm gear.

6. The automotive vehicle of claim 1 further comprising a third gearing element, the third gearing element operably coupled to the first gearing element and the second gearing element.

7. The automotive vehicle of claim 6, wherein the first and third gearing elements are a set of beveled gears and the second gearing element is a worm gear.

8. The automotive vehicle of claim 1, wherein the first operating condition comprises an automated driving system not controlling vehicle driving behavior and wherein the second operating condition comprises the automated driving system controlling vehicle driving behavior.

9. The automotive vehicle of claim 8, wherein the actuator is disengaged from the second gearing element when the first operating condition is satisfied and drives rotation of the second gearing element when the second operating condition is satisfied.

10. The automotive vehicle of claim 9, wherein the second gearing element axially translates relative to the brake pedal emulator housing when the first operating condition is satisfied.

11. The automotive vehicle of claim 1, wherein the first position of the at least one pedal is a deployed position and the second position of the at least one pedal is a stowed position.

12. A pedal assembly for a vehicle, comprising:
a brake pedal emulator housing;
at least one pedal operably coupled to the brake pedal emulator housing and actuatable by an occupant;
a gearing assembly operably coupled to the brake pedal emulator housing and the at least one pedal; and
an actuator operably coupled to the brake pedal emulator housing and the gearing assembly and configured to selectively move the at least one pedal between a deployed position with respect to the brake pedal emulator housing and a stowed position with respect to the brake pedal emulator housing, the actuator being configured to actuate the at least one pedal to the deployed position in response to a deploy command from a controller and to actuate the at least one pedal to the stowed position in response to a stow command from the controller;
wherein the actuator is configured to disengage from the second gearing element and allow translation of the second gearing element relative to the brake pedal emulator housing; and
wherein the gearing assembly comprises a first gearing element operably coupled to the at least one pedal and a second gearing element operably coupled to the actuator and in meshing engagement with the first gearing element, wherein the actuator selectively drives the second gearing element such that rotation of the second gearing element drives the first gearing element in rotation.

13. The pedal assembly of claim 12 wherein the actuator comprises a rotatable threaded member configured to engage with the gearing assembly such that rotation of the threaded member drives the gearing assembly in rotation.

14. The pedal assembly of claim 12 further comprising a push rod coupled to the at least one pedal and operatively coupled to the actuator.

15. The pedal assembly of claim 14, wherein the actuator is linearly oriented with the push rod.

16. The pedal assembly of claim 12, wherein the controller is configured to generate the deploy command in response to satisfaction of a first operating condition and to generate the stow command in response to satisfaction of a second operating condition.

17. The pedal assembly of claim 16, wherein the first operating condition comprises an automated driving system not controlling vehicle driving behavior and the second operating condition comprises the automated driving system controlling vehicle driving behavior.

18. A method of controlling an automotive vehicle, comprising:
providing a vehicle with a first actuator configured to control vehicle acceleration or braking, a controller configured to selectively control the first actuator in an autonomous mode according to an automated driving system, a pedal assembly having a brake pedal emulator housing, at least one pedal operably coupled to the brake pedal emulator housing and actuatable by an occupant, a gearing assembly operably coupled to the brake pedal emulator housing and the at least one pedal, and a second actuator operably coupled to the brake pedal emulator housing and the gearing assembly;
in response to the controller controlling the first actuator in the autonomous mode, automatically controlling the second actuator, via the controller, to actuate the gearing assembly to move the at least one pedal to a stowed position; and
in response to the controller not controlling the first actuator in the autonomous mode, automatically controlling the second actuator, via the controller, to actuate the gearing assembly to move the at least one pedal to a deployed position;
wherein the gearing assembly includes:
a first gearing element operably coupled to the at least one pedal; and
a second gearing element operably coupled to the brake pedal emulator housing and operably coupled with the first gearing element; and
wherein the second actuator is operably coupled to the second gearing element, actuating the gearing assembly includes selectively moving the at least one pedal between the deployed position and the stowed position via disengaging the second actuator from the second gearing element and applying a motive force to the second gearing element.

\* \* \* \* \*